E. E. HICKERSON.
NUT LOCK.
APPLICATION FILED APR. 11, 1917.
1,266,594.
Patented May 21, 1918.
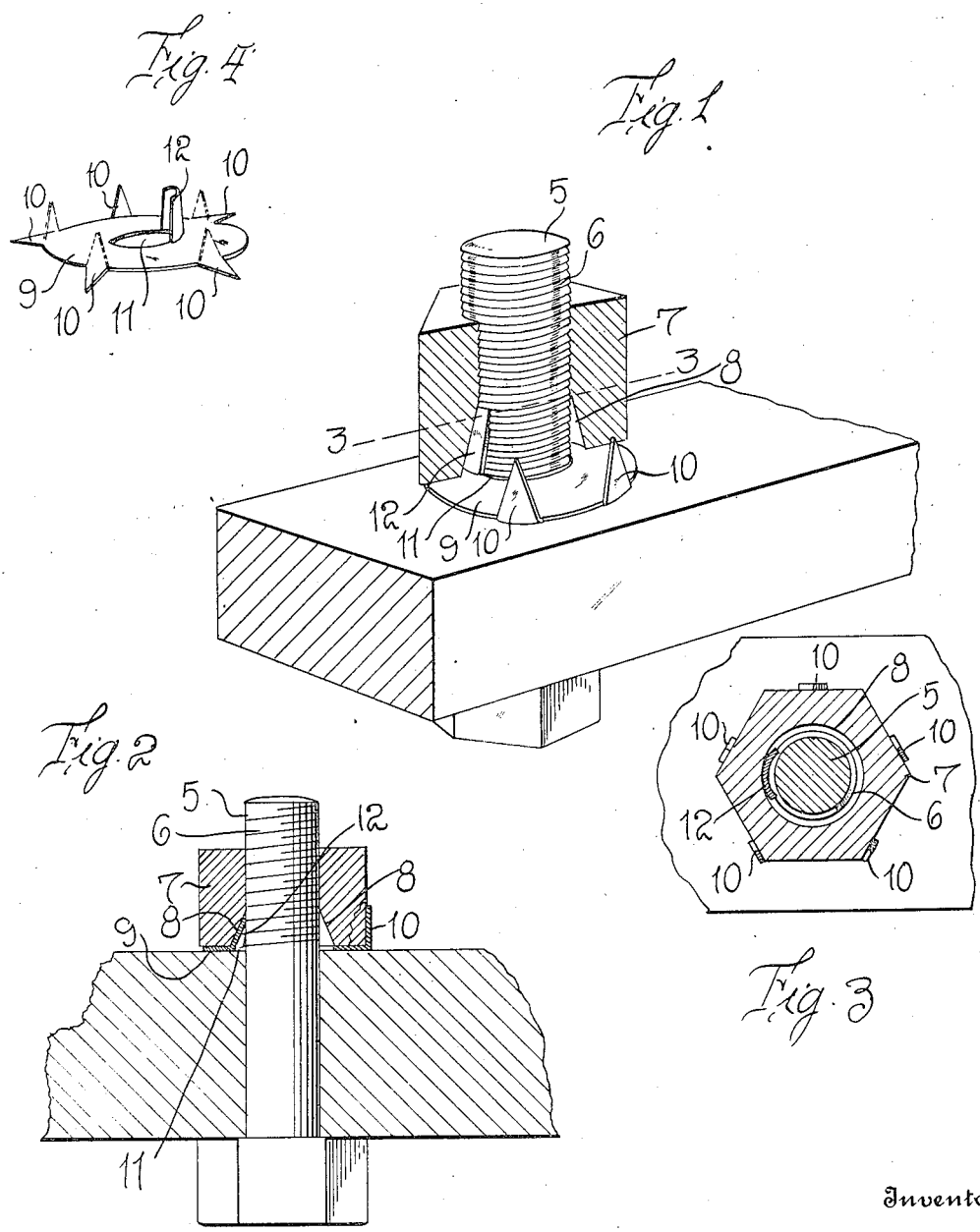
Inventor
ELMER E. HICKERSON

UNITED STATES PATENT OFFICE.

ELMER E. HICKERSON, OF McCOMB, OHIO.

NUT-LOCK.

1,266,594.

Specification of Letters Patent.

Patented May 21, 1918.

Application filed April 11, 1917. Serial No. 161,305.

*To all whom it may concern:*

Be it known that I, ELMER E. HICKERSON, a citizen of the United States, residing at McComb, in the county of Hancock and State of Ohio, have invented certain new and useful Improvements in Nut-Locks, of which the following is a specification, reference being had to the accompanying drawings.

This invention relates to improvements in nut locks and has for its primary object to provide a simple, practical and effective device for securely locking a nut upon a bolt against possibility of accidental loosening or displacement, and which may be manufactured at a minimum cost.

It is another object of the invention to provide a device of the above character, which is constructed so as to lock the nut to the bolt when the nut is threaded home, without necessitating any alterations whatever in the ordinary construction of the bolt.

It is a further general object of the invention to provide a nut locking device which is exceedingly strong and durable, can be easily and quickly applied in practical use, and will not only lock the nut upon the bolt but also prevent turning movement of the bolt within the nut.

With the above and other objects in view, my invention consists in the novel features of construction, combination and arrangement of parts to be hereinafter more fully described, claimed and illustrated in the accompanying drawing, in which, Figure 1 is a perspective view illustrating the preferred embodiment of the invention and showing the nut in section;

Fig. 2 is a longitudinal section;

Fig. 3 is a section taken on the line 3—3 of Fig. 1; and

Fig. 4 is a detail perspective view of the washer.

Referring in detail to the drawing, 5 designates the bolt which may be of any ordinary or approved form and includes the shank provided with threads, indicated at 6.

7 designates the nut which may be of hexagonal, octagonal, or any other desired polygonal form, and is provided with the usual threaded bore which is gradually enlarged diametrically or flared at one of its ends, as shown at 8, such flared end of the bore being smooth or unthreaded.

9 designates a washer plate which is formed of resilient sheet steel and is provided upon its perimeter with a plurality of spaced, radially disposed, outwardly projecting points or spurs 10. This plate is provided at the edge of the bolt receiving opening 11 therein with a yieldable lug or extension 12 projecting from one face of the washer. This lug preferably tapers longitudinally and is curved transversely, the curvature of said lug being appreciably greater than the arc of the edge of the opening 11 from which the lug extends.

In the operation of the device, after the shank of the bolt 5 has been inserted through the objects to be fastened together, the washer plate 9 is arranged upon said bolt and moved inwardly to engage one of its faces with the object, the lug 12 of the washer projecting outwardly from the other face thereof. The nut 7 is now threaded inwardly upon the bolt shank with the flaring or enlarged end 8 of its bore opposed to the washer plate. The tapering wall 8 of the nut bore engaging upon the outer convex surface of the lug 12, gradually forces said lug inwardly toward the threads on the bolt shank and tends to flatten said curved lug and cause the longitudinal edges thereof to bite or cut into the threads on the bolt shank. The teeth or spurs 10 on the outer edge of the washer plate, which are normally disposed in the plane of said plate, are then bent angularly over upon the side faces of the nut 7 so as to effectually prevent turning movement of the nut on the bolt relative to the washer plate. Preferably, five of the nut holding points 10 are provided on the washer plate irrespective of the form of nut employed, and when the nut has been threaded tightly against the face of the plate, said points will be in proper relative positions with respect to the nut faces to be bent over upon the same. It will thus be seen that the washer plate is automatically and securely locked to the bolt when the nut is threaded home, and the only further operation necessary is a very simple one of bending the points 10 upon the nut faces. With the nut and washer thus held together, neither can turn upon the bolt shank relative to the other, nor can the bolt shank turn within the bore of the nut owing to the biting engagement of the edges of the lug 12 with the bolt threads. It will, therefore, be appreciated that by means of the present invention, I have materially simplified devices of this character, whereby the same may be manufactured at exceedingly small cost and used in various instances where an easily applied and effective nut lock is desired.

From the foregoing description, taken in connection with the accompanying drawing, the construction, manner of use and several advantages of the device will be clearly and fully understood. The nut and locking washer may, of course, be made in various sizes for application to bolts of different diameters, and it will also be understood that while I have herein shown and described the preferred construction and arrangement of the several parts, the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

The herein described nut lock including in combination with a bolt, a nut having a threaded bore for engagement upon the bolt shank, said bore having a flared unthreaded portion at one end, a washer plate for engagement upon the said bolt provided with a bolt receiving opening and a tapering lug projecting laterally upon the edge of said opening, said lug being transversely curved on a radius less than the radius of said opening whereby, when the nut is threaded home upon the bolt and the flared end of the nut bore bears upon the convex face of said lug the latter will be forced inwardly toward the bolt threads and flattened to cause the longitudinal edges of the lug to bite into the threads on the bolt, said washer plate being further provided upon its perimeter with a plurality of spaced bendable portions adapted to be angularly bent into engagement with the faces of the nut.

In testimony whereof I hereunto affix my signature in the presence of two witnesses.

ELMER E. HICKERSON.

Witnesses:
J. A. SEBRING,
SAMUEL HUMPHREY.